(12) United States Patent
Murray et al.

(10) Patent No.: US 10,107,835 B2
(45) Date of Patent: Oct. 23, 2018

(54) TIP ENHANCED LASER ASSISTED SAMPLE TRANSFER FOR BIOMOLECULE MASS SPECTROMETRY

(71) Applicant: BOARD OF SUPERVISORS OF LOUISIANA STATE UNIVERSITY AND AGRICULTURAL AND MECHANICAL COLLEGE, Baton Rouge, LA (US)

(72) Inventors: Kermit King Murray, Baton Rouge, LA (US); Suman Ghorai, Baton Rouge, LA (US); Chinthaka Aravinda Seneviratne, Baton Rouge, LA (US)

(73) Assignee: BOARD OF SUPERVISORS OF LOUISIANA STATE UNIVERSITY, Baton Rouge, LA (US)

( * ) Notice: Subject to any disclaimer, the term of this patent is extended or adjusted under 35 U.S.C. 154(b) by 0 days.

(21) Appl. No.: 15/541,731

(22) PCT Filed: Jan. 7, 2016

(86) PCT No.: PCT/US2016/012449
§ 371 (c)(1),
(2) Date: Jul. 6, 2017

(87) PCT Pub. No.: WO2016/112171
PCT Pub. Date: Jul. 14, 2016

(65) Prior Publication Data
US 2018/0003735 A1      Jan. 4, 2018

Related U.S. Application Data

(60) Provisional application No. 62/100,714, filed on Jan. 7, 2015.

(51) Int. Cl.
*H01J 49/00* (2006.01)
*G01Q 30/02* (2010.01)
(Continued)

(52) U.S. Cl.
CPC .............. *G01Q 30/02* (2013.01); *B23K 26/16* (2013.01); *G01Q 60/40* (2013.01);
(Continued)

(58) Field of Classification Search
CPC ........ G01Q 30/02; G01Q 60/70; B23K 26/16; H01J 49/0418; H01J 49/0031; H01J 49/40
(Continued)

(56) References Cited

U.S. PATENT DOCUMENTS

2005/0208304 A1   9/2005   Collier et al.
2010/0320171 A1   12/2010  Mao et al.

OTHER PUBLICATIONS

Murray, et al., "High resolution laser mass spectrometry bioimaging", ScienceDirect, Methods 104, 2016, 118-126.
(Continued)

*Primary Examiner* — Nicole Ippolito
*Assistant Examiner* — Hanway Chang
(74) *Attorney, Agent, or Firm* — Thomas|Horstmeyer, LLP

(57) ABSTRACT

Disclosed are various embodiments for transferring molecules from a surface for mass spectrometry and other sample analysis methods, and the like. A laser is focused onto a tip of an atomic force microscope to remove and capture a quantity of molecules from the surface, so they can be transferred to a mass spectrometer or another instrument for analysis.

20 Claims, 7 Drawing Sheets

(51) Int. Cl.
- G01Q 60/40 (2010.01)
- B23K 26/16 (2006.01)
- H01J 49/04 (2006.01)
- H01J 49/40 (2006.01)

(52) U.S. Cl.
CPC ....... *H01J 49/0418* (2013.01); *H01J 49/0031* (2013.01); *H01J 49/40* (2013.01)

(58) Field of Classification Search
USPC .......................................... 850/8, 9, 21, 33
See application file for complete search history.

(56) References Cited

OTHER PUBLICATIONS

Ghorai, et al., "Tip-Enhanced Laser Ablation Sample Transfer for Biomolecule Mass Spectrometry", J. Am. Soc. Mass Spectrom., 2015, 26:63-70.

Murray, et al., "Tip Enhanced Laser Ablation Sample Transfer for Mass Spectrometry", Mater. Res. Soc. Symp. Proc., vol. 1754, 2015, Materials Research Society, 9 pages.

Wu, et al., "Imaging of elements and molecules in biological tissues and cells in the low-micrometer and nanometer range", ScienceDirect, International Journal of Mass Spectrometry 307, 2011, 112-122.

Becker, "Imaging of metals in biological tissue by laser ablation inductively coupled plasma mass spectrometry (LA-ICP-MS): state of the art and future developments", Journal of Mass Spectrometry, 2013, 48, 255-268.

Stöckle, et al. "Nanoscale Atmospheric Pressure Laser Ablation-Mass Spectrometry", Anal. Chem. 2001, 73, 1399-1402.

Zhu, et al., "Atmospheric Pressure Sampling for Laser Ablation Based Nanoscale Imaging Mass Spectrometry: Ions or Neutrals?", J. Phys. Chem. C, 2011, 115, 1006-1013.

Schmitz, et al., "Towards Nanoscale Molecular Analysis at Atmospheric Pressure by a Near-Field Laser Ablation Ion Trap/Time-of-Flight Mass Spectrometer", Anal. Chem., 2008, 80, 6537-6544.

Zhu, et al., "Material ejection and redeposition following atmospheric pressure near-field laser ablation on molecular solids", Anal Bioanal Chem, 2010, 396: 163-172.

International Search Report for PCT/US2016/012449 dated Mar. 11, 2016.

Ghorai, S. et al., "Tip-Enhanced Laser Ablation Sample Transfer for Biomolecule Mass Spectrometry." Journal of American Society of Mass Spectrometry, vol. 26, No. 1, Oct. 7, 2014, pp. 63-70 (online), (retrieved on Mar. 1, 2016). Retrieved from the Internet (http://europepmc.org/articles/pmc4276512).

TIP ENHANCED LASER ASSISTED SAMPLE TRANSFER FOR BIOMOLECULE MASS SPECTROMETRY

CROSS REFERENCE TO RELATED APPLICATIONS

This application is the 35 U.S.C. § 371 national stage application of PCT Application No. PCT/US2016/012449, filed Jan. 7, 2016, where the PCT claims priority to, and the benefit of, U.S. provisional application entitled "TIP ENHANCED LASER ASSISTED SAMPLE TRANSFER FOR BIOMOLECULE MASS SPECTROMETRY" having Ser. No. 62/100,714, filed Jan. 7, 2015, both of which are herein incorporated by reference in their entireties.

STATEMENT REGARDING FEDERALLY SPONSORED RESEARCH OR DEVELOPMENT

This invention was made with government support under agreements 5R21DA035504-02 awarded by the National Institute of Health and CHE-0848319 awarded by the National Science Foundation. The Government has certain rights in the invention.

BACKGROUND

Mass spectrometry imaging is a powerful technique that can be used to determine the distribution of specific biomolecules in tissue sections and their relative abundance, providing a mass-resolved image for each of the detected compounds. Currently, for imaging mass spectrometry, it is possible to obtain mass spectra of large biomolecules such as peptides and proteins using matrix-assisted laser desorption ionization (MALDI) mass spectrometry imaging at a spatial resolution of 5 to 200 µm.

BRIEF DESCRIPTION OF THE DRAWINGS

Many aspects of the present disclosure can be better understood with reference to the following drawings. The components in the drawings are not necessarily to scale, with emphasis instead being upon clearly illustrating the principles of disclosure. Moreover, in the drawings, like reference numerals designate corresponding parts throughout the several views.

DISCUSSION

Figure 1:
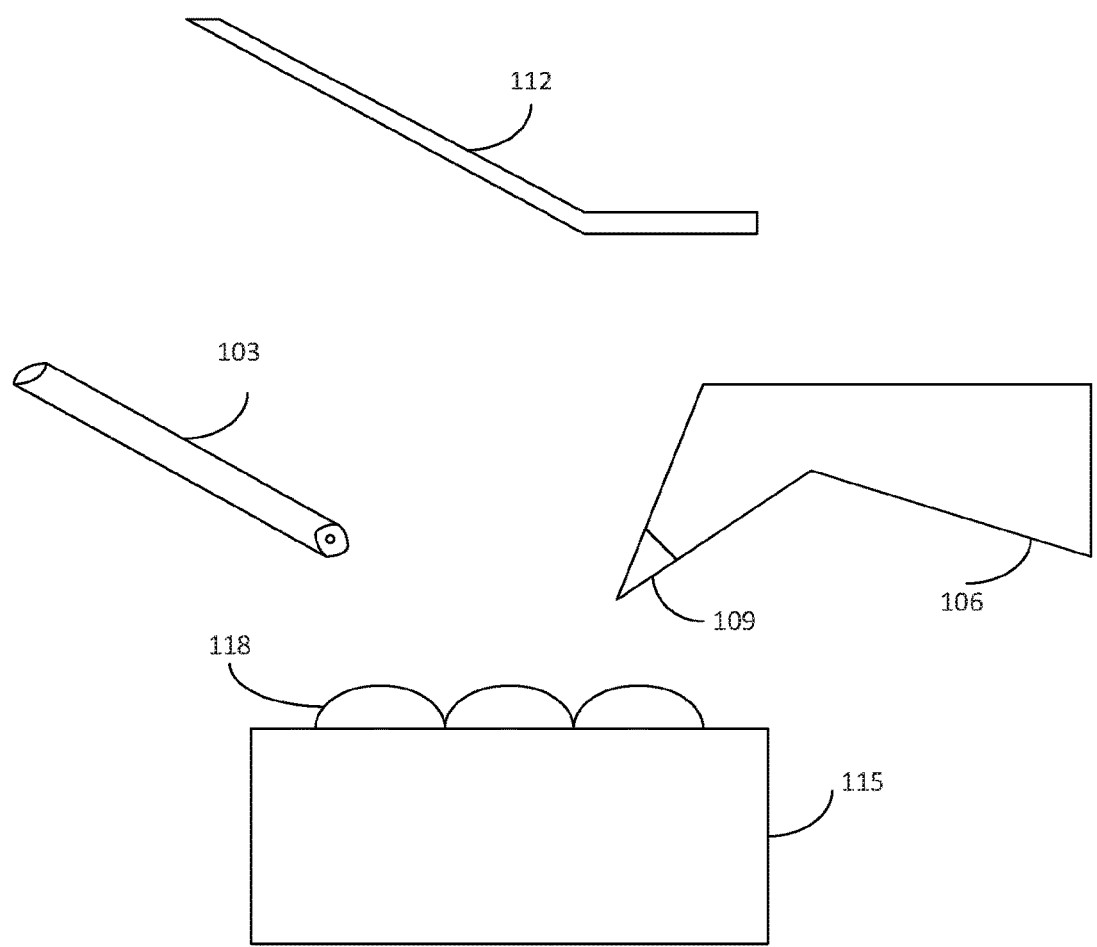
FIG. 1 is a schematic representation illustrating an example of a configuration for the atomic force microscope tip enhanced laser assisted sample transfer experiment.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Detailed Discussion

Embodiments of the present disclosure provide for methods of transferring molecules from a surface for mass spectrometry and other sample analysis methods, methods of capturing molecules from a surface for mass spectrometry and other sample analysis methods, methods of removing molecules from a surface for mass spectrometry and other sample analysis methods, systems for capturing and transferring molecules for mass spectrometry, and the like. Embodiments of the present disclosure can be used for mass spectrometry. Embodiments of the present disclosure can also be used for other analysis methods. Embodiments of the present disclosure use tip-enhanced laser ablation and an atomic force microscope to remove and capture a sufficient quantity of molecules from a surface, so they can be transferred to a mass spectrometer or another instrument for analysis. Mass spectra of smaller molecules and atoms can be achieved with spatial resolutions less than 1 µm using secondary ionization mass spectrometry (SIMS) and laser ablation inductively coupled mass spectrometry (LA-ICP MS). This micrometer size range is important because it is in the regime of single cells and the ability to perform mass spectrometry at this level can enable single cell imaging.

In an embodiment, molecules can be transferred from a surface to a wire, or another type of capture device, as may be appreciated, for mass spectrometry using an atomic force microscope and a pulsed laser. A tip of the atomic force microscope can be positioned above the surface to image a sample of molecules. The pulsed laser can be focused onto the tip of the atomic force microscope and ablate the sample from one or more ablation spots located on the surface. The tip can act as an antenna for the electromagnetic radiation and enables the ablation of the sample with an ablation spot size that is much smaller than if the pulsed laser were focused with a conventional lens system. The sample can be ablated onto a wire. In an embodiment, the wire is suspended above the surface at a predetermined distance.

In an embodiment, the atomic force microscope can have a gold-coated silicon tip. The tip can have a radius curvature of about 30 nm. In some embodiments, the tip is a gold-coated silicon probe (e.g., ACCESS-NC-GG, Applied Nanostructures, Mountain View, Ga.). In some embodiments, the atomic force microscope used is (Anasys, Santa Barbara, Calif.). In some embodiments, the nominal value of the spring constant can be about 78 N/m and the nominal value of the resonant frequency may be about 300 Hz. In some embodiments, the distance between the tip and the surface is about 15 nm. In other embodiments, the distance between the tip and the surface is about 10 nm. In some embodiments, the tip is engaged in a tapping mode with the sample at an amplitude of about 1V, where the amplitude sensitivity of the tip is about 6-7 nm/V. The tip-to-sample distance may be set to about 15 nm. Thus, the tip can be oscillating between 0 and 15 nm while being irradiated.

In an embodiment, the pulsed laser can be a 355 nm frequency tripled or a 532 nm frequency doubled pulsed Nd:YAG laser (Powerlite 8000, Continuum, San Jose, Calif.) with a repetition rate of 10 Hz and a 5 ns pulse width. However, other pulsed lasers may also be used. The polarization of the laser beam can be adjusted using a half wave plate, such as a rotating half wave plate, and can be polarized perpendicular to the axis of the tip. The laser beam can be mildly focused using a 25 cm calcium fluoride ($CaF_2$) lens to irradiate the tip at an angle 83° from normal, nearly parallel with the laser table. In some embodiments, the focal point of the laser beam can be about 4 cm beyond the tip and the resulting laser diameter where the laser beam intersects the tip can be about 600 µm. In some embodiments, the corresponding fluence can be 850 $J/m^2$, depending on the wavelength. In some embodiments, ablation is performed using about 30 laser shots at over 3 seconds per ablation spot.

In an embodiment, the molecules can comprise anthracene or rhodamine 6G. In alternative embodiments, the molecules can comprise angiotensin II or bovine insulin. In other embodiments, the molecules can comprise lipids.

In an embodiment, the wire is a silver wire that is used to capture the molecules. In other embodiments, the wire can be a gold or stainless steel wire. The wire can have a diameter of about 100 µm. The wire can be flattened at its tip to produce a ribbon with a width of about 400-500 µm. The wire can be mounted on a three-axis mechanical stage and positioned above the tip. In some embodiments, the distance between the wire and the ablation spot is about 100 µm. In some embodiments, the wire is cut and affixed to a metal target using conductive tape, such as double-sided conductive tape. In some embodiments, the molecules can be dissolved in a saturated matrix solution and deposited on a target. Any suitable solvent can be used to dissolve the analyte after capture, as may be appreciated. According to various embodiments, the wire is suspended about 300 µm above the sample surface and about 100 µm from the tip. However, in other embodiments, the wire can be suspended less than 300 µm above the sample surface.

In an embodiment, craters between 600 nm and 1 µm in diameter and between 150 nm and 800 nm deep are formed in the ablation spots located on the surface. In some embodiments, craters can have three-fold symmetrical ablation patterns, which indicates enhanced material removal at the edges of the atomic force microscope tip. In some embodiments, at least 4% of the material that is removed from the surface is deposited on the wire.

While embodiments of the present disclosure are described in connection with the Example and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLES

The general approach to mass spectrometry on small scales is to remove material from a small region using a focused laser or particle beam. The material is removed from the sample and ionized directly and transported to the mass spectrometer for ionization. The challenges in these sampling approaches are focusing the laser or particle beam on a sub-micrometer region of the target, transporting ions or neutrals to the ion source, and forming ions with high efficiency and without fragmentation.

The widespread use of laser-based mass spectrometry imaging began with the development of imaging matrix-assisted laser desorption/ionization in the late 1990s. MALDI imaging involves the collection of mass spectra in a regular patterned array across an approximately 10 µm thick section that is deposited on a conductive microscope slide. Because MALDI creates ions with limited fragmentation, its use in imaging is applicable to a range of biomolecules from drugs and their metabolites to peptides and proteins. The spatial resolution is limited by the spot size of the focused laser and ranges from 20 to 200 µm, although the detectable signal and throughput also must be considered. The use of specialized optics can improve the spatial resolution further. For example, an objective lens with a central hole for ion transmission in a custom time-of-flight mass spectrometer achieved 1 µm spatial resolution for MALDI in vacuum. A similar system adapted to a Fourier transform ion cyclotron resonance mass spectrometer achieved a lateral resolution of 500 nm, but required a diameter of 8 µm to produce sufficient ions for detection. Modification of the optical configuration of commercial MALDI mass spectrometers can be used to achieve spatial resolution down to 5 µm.

Secondary ion mass spectrometry (SIMS) imaging uses a focused ion beam to create ions with a spatial resolution less than a micrometer, but with a mass range below 1000 m/z. SIMS can be used in a low beam intensity static mode or high beam intensity dynamic mode. Static SIMS can be used for qualitative imaging whereas dynamic SIMS is used for quantitative elemental imaging and depth profiling. With its excellent spatial resolution, SIMS imaging can be used for the analysis of biomolecules at the sub-cellular level, and the spatial resolution for SIMS imaging can be as low as 50 nm for atomic and small molecular ions. The use of cluster ions for the primary ion beam can improve the mass range, however, this comes at the expense of spatial resolution.

The spatial resolution of MALDI imaging is currently restricted by the diffraction limit and typical optical configurations are far above this limit. However, near-field optics can be used to localize electromagnetic radiation below the diffraction limit, which is roughly half of the wavelength of the light. Near-field desorption and ablation reduces the spatial resolution of laser-based mass spectrometry imaging to the micrometer size range and below and was first used for mass spectrometry of molecules using electron ionization. Here, a reflective-coated optical fiber probe can be used to ablate material from a solid sample at a spatial resolution of 200 nm. Neutral molecules can be sampled into vacuum through a capillary tube and directed into an electron ionization source of the mass spectrometer. The sampling efficiency for this approach is around 0.01% due to the 10% transfer efficiency and 0.1% ionization efficiency. Here, efficiency is defined as the fraction of the solid material removed that is converted to detectable ions in the mass spectrometer. A 5 µm resolution was achieved for imaging of anthracene. The resolution in this case is limited by detection sensitivity. This is further affected by the fact that desorbed material may not remain in the gas phase and as much as 70% of the desorbed or ablated material can be redeposited.

Near-field laser ablation can be used to generate plasmas for atomic optical spectroscopy or mass spectrometry. Ablation can be achieved in an aperture mode using a pulled optical fiber or in an apertureless mode using a metal needle that acts as an antenna for the electromagnetic radiation enhancing the localized field at the atomic force microscope tip. Apertureless laser ablation with a thin silver needle and 532 nm Nd:YAG laser can be used to sample material for inductively coupled plasma mass spectrometry (LA-ICP-MS) with sub-micron spatial resolution. Although there is tip enhancement effect for the ablation, it is not clear that it is a near-field effect since the tip was ca. 100 nm from the surface. A similar atomic force microscope tip-enhanced laser desorption ionization can be used for molecular imaging mass spectrometry. Here, a 532 nm wavelength and 5 ns pulse width Nd:YAG laser can be focused onto an atomic force microscope tip. The atomic force microscope tip can be rastered across a pattern of, e.g., rhodamine 6G dye and the molecular cation of the dye molecule can be monitored with an ion trap mass spectrometer. A near-field LDI image was recorded at 2 µm spatial resolution that was limited by the limit of detection rather than the ability to minimize the ablation spot size.

To develop tip-enhanced laser mass spectrometry for the imaging of large molecules, a method for coupling to a soft ionization method such as MALDI, electrospray, or atmospheric pressure chemical ionization was developed. One approach is to merge the ablated material with an electrospray source. This technique can be used with a unique etched optical fiber configuration for infrared laser ablation imaging. The spatial resolution observed was 20 µm and, although an optical fiber was used, ablation conditions were not in the near-field regime. An alternative approach that does not require merging of the ablation plume with the electrospray is laser ablation sample transfer. In this approach, the ablated material can be captured in static or flowing solvent or on a solid surface, after which, MALDI or electrospray can be performed. Decoupling the sampling and ionization steps allows both to be optimized independently.

In the present work, a tip enhanced laser assisted sample transfer with an atomic force microscope has been used to position a conductive probe for UV laser material removal. A 355 nm pulsed laser was focused onto a gold-coated silicon atomic force microscope tip. The desorbed or ablated material was captured on a silver wire suspended above the atomic force microscope tip and the wire was removed for analysis by LDI or MALDI using a commercial time-of-flight mass spectrometer. Removal of material with submicron level spatial resolution, topographical images of the ablation craters, LDI, and MALDI detection of the captured material were demonstrated. The system is able to transfer amol quantities of molecules as large as peptides and small proteins without fragmentation.

A custom atomic force microscope (Anasys, Santa Barbara, Calif.) was used for sample imaging and tip enhanced laser assisted sample transfer. The system is based on a commercial system (afm+) that was modified to allow open access to the atomic force microscope stage but is otherwise identical. A gold-coated silicon probe (ACCESS-NC-GG, Applied Nanostructures, Mountain View, Calif.) with a radius of curvature of 30 nm was used for the ablation experiments. The nominal values of spring constant and resonant frequency were 78 N/m and 300 kHz, respectively. The probe geometry allows a direct optical path to the tip due to its 109° angle with respect to the cantilever axis. The ablation laser was a 355 nm frequency tripled pulsed Nd:YAG laser (Powerlite 8000, Continuum, San Jose, Calif.) with a repetition rate of 10 Hz and 5 ns pulse width. The polarization of the beam was adjusted using a half wave plate and polarization perpendicular to the tip axis or parallel to the tip axis was used in all of the experiments described below. The optimum polarization for 355 nm ablation was found to be perpendicular to the tip. At 532 nm wavelength, the optimum polarization was parallel to the tip. The tip used in the 355 nm laser was a triangular pyramid that could favor enhancement at the pyramid edges for some combinations of wavelength and polarization, similar to what has been observed for triangular nanoprisms. The beam was mildly focused using a 25 cm $CaF_2$ lens to irradiate the atomic force microscope probe at an angle of 82° from normal, which is nearly parallel with the laser table. The laser was directed toward the atomic force microscope tip at an angle of 45° in the horizontal plane and 8° in the vertical plane (nearly parallel to the target). The focal point was approximately 4 cm beyond the probe and the resulting laser diameter where it intersected the tip was 600 µm and the corresponding fluence was 850 J/m². Tip-to-surface control for laser ablation was accomplished by engaging the tip in a tapping mode with the sample at an amplitude set point of 1 V, where the amplitude sensitivity of the tip was 6-7 nm/V. The tip was operated in the tapping mode with the tip-to-sample distance set to 15 nm. Thus, the tip oscillated between 0 and 15 nm while being irradiated. Ablation was performed using 30 laser shots over 3 s per ablation spot. The atomic force microscope conditions were the same for all of the material removal reported below.

Referring next to FIG. 1, shown is a schematic representation of an experimental configuration for atomic force microscope tip enhanced laser assisted sample transfer according to various embodiments. A pulsed laser 103 can be focused onto a gold-coated silicon tip 109 of the atomic force microscope 106. The gold-coated silicon tip 109 can be held at a predetermined distance above a film 118 containing molecules on a sample surface 115. The predetermined distance between the gold-coated silicon tip 109 and the film 118 can be, for example, approximately 10-15 nm. A capture wire 112 can be suspended approximately 100 µm from the gold-coated silicon tip 109 and 300 µm from the sample surface 115. The pulsed laser 103 can be directed at an 8° angle with respect to the plane of the sample surface 115.

The molecules can be ablated and captured on the capture wire 112, which has a diameter of approximately 100 µm. The capture wire 112 can be flattened manually at the tip to produce a ribbon 400-500 µm in width. In some embodiments, the capture wire 112 can be mounted on a three-axis mechanical stage and positioned above the gold-coated silicon tip 109. The predetermined distance can be viewed using the atomic force microscope 106 video camera and the distance between the capture wire 112 and an ablation spot can be set to approximately 100 µm. The height of the capture wire 112 above the sample surface can be approximately 300 µm. For multiple spot collection, the capture wire 112 can be kept in the same position above the gold-coated silicon tip 109.

The mass spectrometer used in this work was a MALDI TOF/TOF mass spectrometer (UltrafleXtreme, Bruker Corporation, Billerica, Mass.). The instrument can be used in reflectron mode and a mass spectra result was determined from laser desorption ionization for anthracene and rhodamine 6G and MALDI for angiotensin II and insulin. For direct LDI, the capture wire 112 can be removed from the positioning stage after capture, cut to a 4 mm length, and attached to a MALDI target using double-sided conductive tape. The laser spot diameter in the MALDI mass spectrometer can be 100 µm and 500 shots can be used to obtain the spectrum on each ablation spot.

For MALDI mass spectrometry of angiotensin II and insulin, a saturated solution of α-cyano-4-hydroxycinnamic acid (CHCA) dissolved in a mixture of 85:15 ratio of acetonitrile (EMD Chemicals, 99.8% HPLC) and 0.1% trifluoroacetic acid (TFA) in water was used as the matrix. After capture, the capture wire 112 was washed in 5 µl of the matrix solution and the matrix and extracted analyte can be deposited on the MALDI target. The spectrum for angiotensin II was obtained in reflectron mode whereas linear mode was used for insulin. A 100 µm laser spot diameter and 500 shots were used to obtain the mass spectra in each spot. The reported spectra are a sum over the region of the deposit where the detectable signal was observed.

To prepare thin film 118 for ablation, anthracene (Sigma-Aldrich, 99%) was dissolved in acetonitrile (EMD Chemicals, 99.8% HPLC) at a concentration of 1 mg/ml and a similar concentration solution of rhodamine 6G (Sigma-Aldrich, 99%) was prepared in dichloromethane (Sigma-Aldrich, 99.9%). The thin film 118 of the sample was prepared by slow evaporation of 3 drops of solution placed on glass cover slip.

Initial studies used tip enhanced transfer of material to a capture wire 112 that was attached to a target for direct laser desorption ionization mass spectrometry analysis. The atomic force microscope system was used to irradiate an anthracene thin film prepared from the acetonitrile solution.

Figure 2:
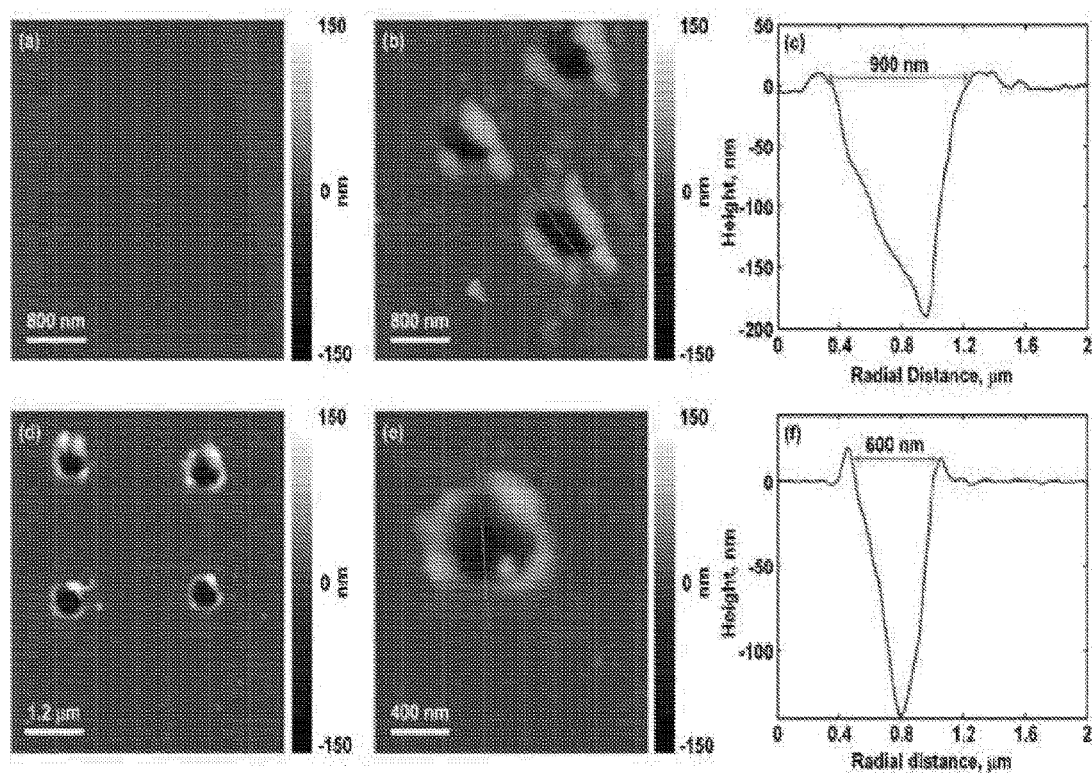
FIG. 2 includes atomic force microscope images of anthracene thin film before and after laser irradiation.

Referring next to FIG. 2, shown is an atomic force microscope image of anthracene thin film before laser irradiation. The film roughness was found to be 3.4 nm, measured over the 1 µm area as illustrated in FIG. 2(a). Material removal was performed by directing the laser onto the probe for 3 seconds with a repetition rate of 10 Hz at a fluence of 850 J/m² with the tip held 15 nm above the surface as described above. A representative image of the crater created using 30 laser shots is shown in FIG. 2(b). The spots were elongated in the dimension perpendicular to the laser beam with a dimension of ca. 1 µm×0.6 µm. The height profile of the crater along the line indicated in FIG. 2(b) is shown in FIG. 2(c). The average depth of the ablation craters under the conditions used for FIG. 2 was 200 nm and the average ablation spot area was 0.5 µm². This corresponds to 40 fg of material removed from the thin film, assuming a conical crater. A 200 nm wide and 40 nm tall rim was formed around the anthracene ablation crater, which may be attributed to the buildup of molten ejecta.

FIG. 2 illustrates near field laser produced craters using the atomic force microscope. FIGS. 2(a) and 2(b) show atomic force microscope height images before and after the ablation experiment respectively with anthracene thin film; whereas the height images for ablation of rhodamine 6G are shown in FIGS. 2(d) and 2(e). The depth profiles of the crater are shown in FIGS. 2(c) and 2(f) for anthracene and rhodamine 6G, respectively.

Laser ablation craters for rhodamine 6G are shown in FIG. 2(d). The laser energy, focus, and number of shots were identical to that used to obtain the craters shown in FIG. 2(b). The rhodamine craters were round with an average size of 900×650 nm. An image of a single crater is shown in FIG. 2(e) and its depth profile is shown in FIG. 2(f). The average depth of the craters was 150 nm, which corresponds to 30 fg of material removed. The ejecta rim was 20 nm tall and 100 nm wide; the smaller crater rim may be related to the higher melting point of rhodamine 6G (290° C.) compared to anthracene (218° C.) but may also be affected by the film morphology and absorption of the two compounds.

Figure 3:
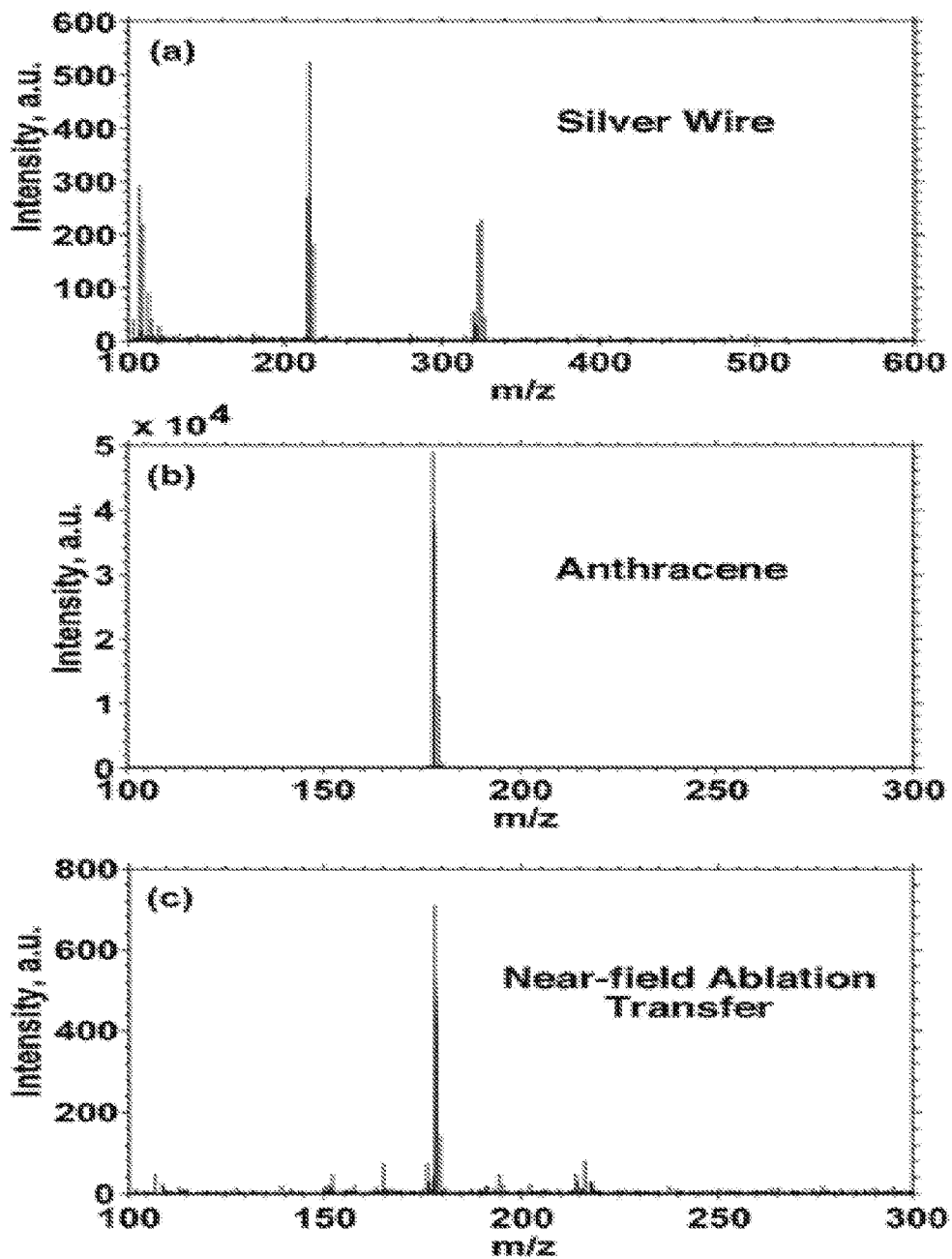
FIG. 3 that shows examples of laser desorption ionization (LDI) mass spectra of a blank silver wire, silver wire dipped in anthracene solution and 355 nm wavelength near field laser ablation capture on silver wire.

Referring next to FIG. 3, shown is LDI mass spectra of (a) a blank silver wire, (b) a silver wire dipped in anthracene solution, and (c) near field laser ablation capture on a silver wire. A total of 18 spots were irradiated under the conditions described above. Ablated anthracene from these spots was collected on a single flattened silver wire, which was cut to a length of 4 mm and mounted on a steel MALDI target with double-side conductive tape. The mass spectrum of the silver wire alone is shown in FIG. 3(a). The peaks at m/z of 107 and 109 arise from the abundant silver isotopes at approximately equal abundance. The peaks around m/z 216 and m/z 324 arise from $Ag_2^+$ and $Ag_3^+$ are observed from direct irradiation of the silver surface, which is consistent with published results. The LDI mass spectrum dipped in a 1 mg/mL solution of anthracene in acetonitrile solvent is shown in FIG. 3(b). The M⁺. peak for anthracene is observed at m/z 178. The mass spectrum of anthracene near field ablated and captured on the silver wire is shown in FIG. 3(c).

Although the signal is two orders of magnitude lower, the anthracene peak is observed at m/z 178.

Figure 4:
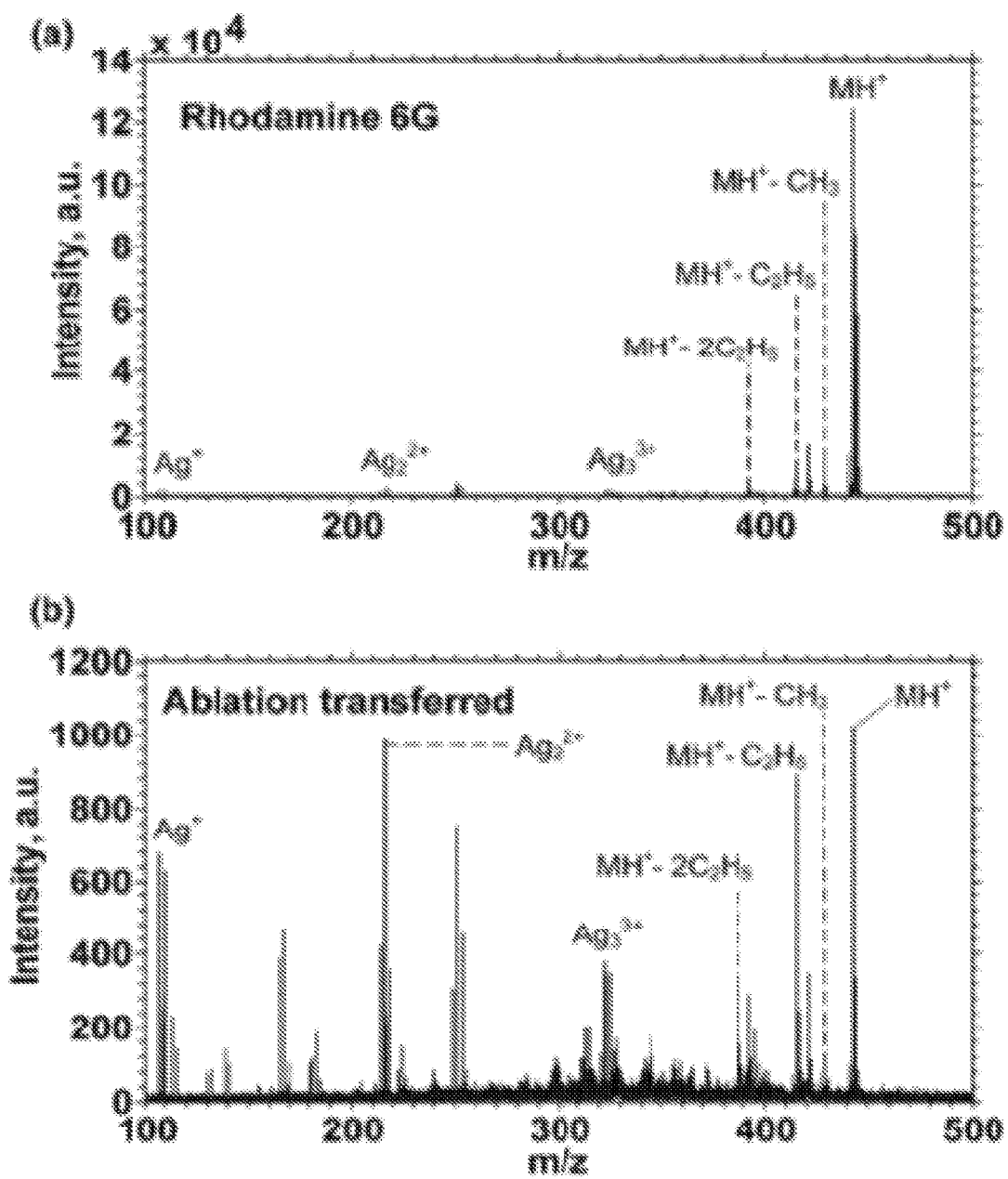
FIG. 4 shows examples of mass spectra of rhodamine 6G.

Referring next to FIG. 4, shown are mass spectra of rhodamine 6G. LDI mass spectrum was obtained by dipping a silver wire in a 1 mg/mL dichloromethane solution of rhodamine is shown in FIG. 4(a). The prominent peaks at m/z 388, 415 and 444 are associated with rhodamine 6G LDI. The prompt fragmentation results from alkyl groups from the dye molecule and has been reported previously. The LDI mass spectrum of rhodamine 6G was obtained by 355 nm laser wavelength transfer from 18 ablation spots under the conditions reported for FIG. 2 is shown in FIG. 4(b). The mass spectrum shows peaks at 388, 415 and 444 characteristic of rhodamine 6G, although the 388 peak is somewhat larger, suggesting that some fragmentation may have occurred during the near-field ablation.

The efficiency of the tip enhanced laser assisted sample transfer was estimated by comparison of the LDI signal of transferred rhodamine 6G with the signal obtained from a sample deposited from a solution of known concentration. To test the transfer efficiency, a 5 μL aliquot of rhodamine 6G from a 1 nM solution in dichloromethane was deposited on the MALDI target to form an approximately 2 mm diameter spot containing 5 fmol rhodamine 6G. LDI was performed exhaustively on the spot by irradiating each point on the deposit until the sample was depleted (several hundred laser shots) and the signal approached zero. The integrated signal for the base peak at m/z 444 was recorded and used as a calibration of signal per mol sample. The ablated rhodamine 6G spot dimensions were 900×650 nm and 150 nm in depth, yielding 70 amol material for a single conical crater. Comparison of the signal obtained from multiple ablated craters (for example FIG. 4(b)) to the calibration gives a sample collection efficiency of 4% with an error of 0.5%. This is similar to the efficiency reported for droplet collection using far field ablation.

Figure 5:
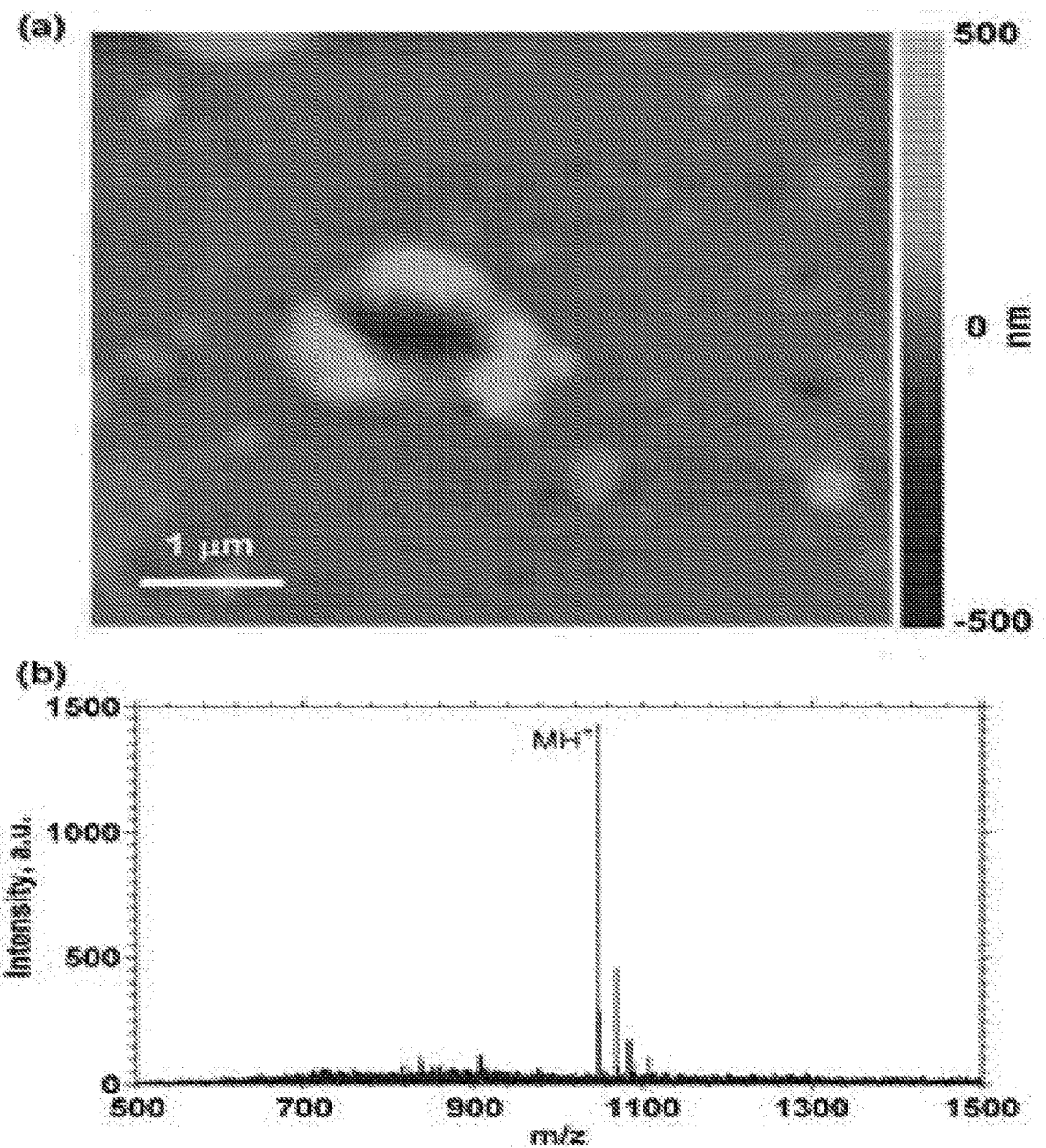
FIG. 5 illustrates an example of a tip enhanced laser assisted sample transfer of peptide angiotensin II showing an atomic force microscope image of a laser produced crater and MALDI mass spectrum of material transferred from a single spot.

Referring next to FIG. 5, shown is a tip enhanced laser assisted sample transfer of the peptide angiotensin II showing an atomic force microscope image of a laser produced crater in FIG. 5(a) and MALDI mass spectrum of material transferred from a single spot om FIG. 5(b). It was found that larger molecules could also be transferred without fragmentation using the tip-enhanced laser assisted sample transfer system. FIG. 5 shows the 355 nm ablation transfer of the peptide angiotensin II. An atomic force microscope image of the laser-produced crater in a thin film of the peptide is shown in FIG. 5(a). The laser fluence was 1.1 kJ/m$^2$ and 30 shots were used to remove the material. The craters ranged from 500 to 800 nm deep with dimensions of 1100×650 nm, corresponding to 500 amol of peptide. Assuming a 4% transfer efficiency as determined above, this corresponds to 20 amol transferred to the wire. The rim has a threefold rotational symmetry coincident with the edges of the triangular pyramid atomic force microscope tip, suggesting an edge enhancement of the electric field at these points. The transferred material was dissolved in 5 μl of saturated CHCA in 85:15 acetonitrile and 0.1% TFA and deposited on the MALDI target for analysis. The mass spectrum in FIG. 5(b) was obtained in positive ion reflectron mode. The most intense peak in the mass spectrum is protonated angiotensin [M+H]$^+$ with sodium and potassium adduct peaks visible to higher mass.

Figure 6:
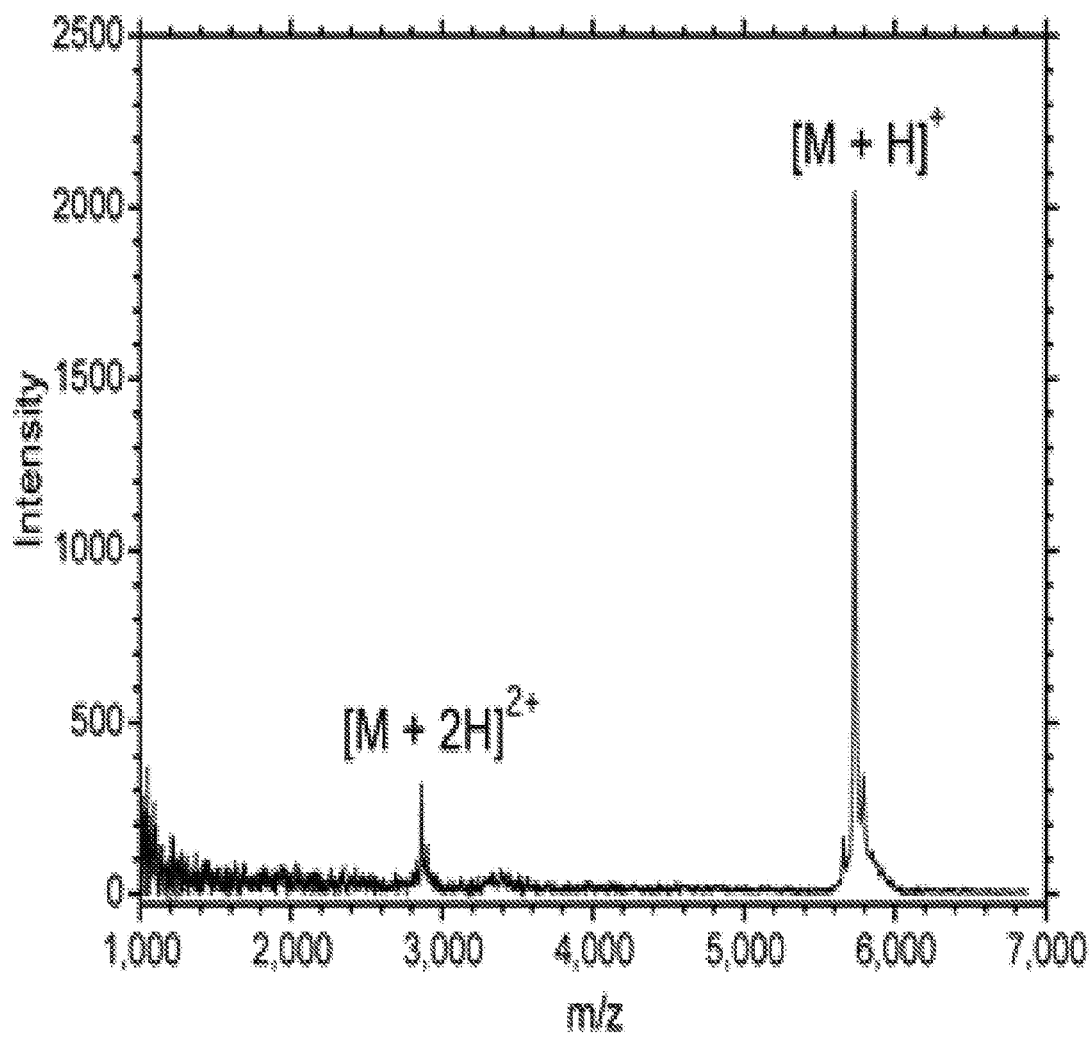
FIG. 6 shows a MALDI mass spectrum of protein insulin using material collected by an atomic force microscope tip enhanced ablation and capture at 532 nm laser wavelength.

Referring next to FIG. 6, shown is a MALDI mass spectrum of the protein insulin using material collected by 532 nm laser wavelength atomic force microscope tip enhanced ablation and capture. The largest polypeptide that was transferred and observed by MALDI was bovine insulin. A linear mode MALDI mass spectrum of insulin is shown in FIG. 6. The material was transferred at a laser fluence of 1.1 kJ/m$^2$ and 30 shots from a single spot, dissolved in matrix, and deposited on a MALDI target for analysis as above. The base peak in the mass spectrum is protonated insulin with partially resolved sodium and potassium adducts contributing to the broad high-mass tail of the peak.

The observed tip enhanced material removal that may be a result of either local enhancement of the light field at the atomic force microscope tip or rapid heating of the tip with the thermal energy transferred to the sample. The observation that the optimum laser polarization for 355 nm laser wavelength ablation is perpendicular to the tip axis rather than parallel differs from previous reports of apertureless tip enhancement, but as noted above, the triangular pyramid shape of the atomic force microscope tip may lead to near field enhancement at the pyramid edges with perpendicular polarization, similar to results from triangular nanoparticles. With 532 nm radiation, parallel polarization is favored and removes more than five times as much material as perpendicular polarization, consistent with a near-field effect. The fact that the ablation crater is much larger than the tip radius is somewhat unexpected, but is consistent with field enhancement at the pyramidal tip edges. The 600 nm to 1 μm crater diameters are generally consistent with the crater sizes observed in previous studies using apertured and apertureless tips.

The MALDI mass spectrum of insulin obtained using 532 nm tip-enhanced laser ablation transfer is shown in FIG. 6. The protein was transferred from 10 individual ablation spots, dissolved in matrix, and deposited on the MALDI target for analysis. The most intense peak in the mass spectrum is the protonated insulin molecule at m/z 5734. The doubly protonated insulin molecule is also observed at m/z 2868. In contrast to laser ablation transfer at 355 nm, additional fragmentation peaks were not observed. The gentler material transfer at 532 nm as compared to 355 nm may be attributed to the stronger plasmon absorption expected at this wavelength for the 30 nm radius gold coated atomic force microscope tip. Because the capture is separate from analysis, tip enhanced capture of materials can be used with various analysis methods such as DNA/RNA sequencing and fluorescence assays as well as separations and other sample processing prior to mass spectrometry.

Figure 7:
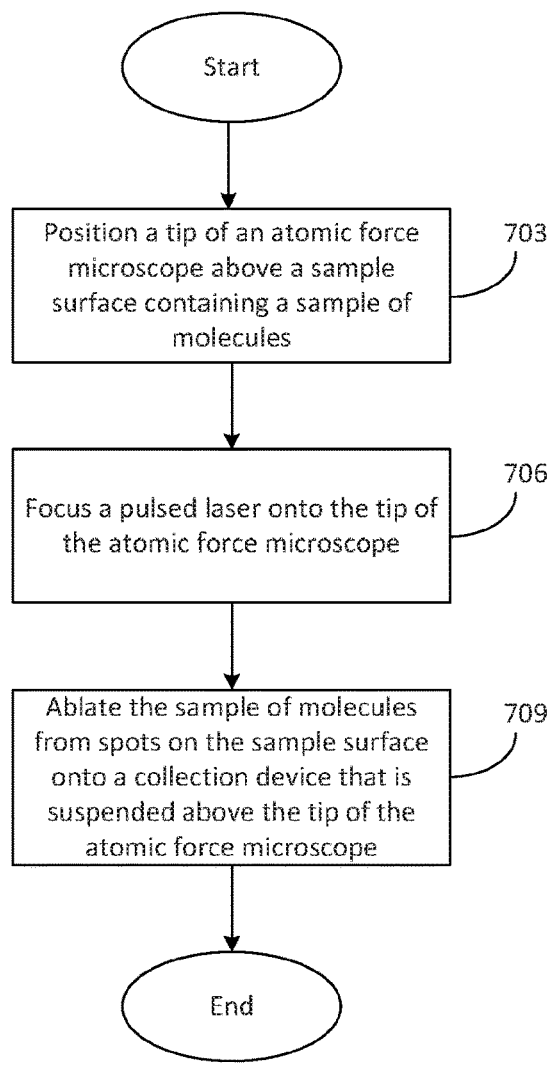
FIG. 7 is a flowchart illustrating one example of a method transferring molecules from a film to a collection device for analysis according to various embodiments of the present disclosure.

Referring next to FIG. 7, shown is flowchart illustrating one example of a method of transferring molecules from a film to a collection device for analysis. Beginning at box 703, a tip of an atomic force microscope 106 (FIG. 1) is positioned above a sample surface. The tip can be, for example, a gold-coated silicon tip or another appropriate tip. The sample surface can comprise, for example, a film. In some embodiments, the distance between the tip and the sample surface can be about 15 nm. In other embodiments, the distance between the tip and the surface can be about 10 nm.

Next, at box 706, a pulsed laser 103 (FIG. 1) is focused onto the tip of the atomic force microscope 106 (FIG. 1). The polarization of the laser beam can be adjusted using a half wave plate, such as a rotating half wave plate, and can be polarized with respect to the axis of the tip. For example, the laser beam can be polarized perpendicular or parallel. The laser beam can be mildly focused using a 25 cm CaF$_2$ lens to irradiate the tip at an angle that is nearly parallel with the laser table. In some embodiments, the focal point of the laser beam can be about 4 cm beyond the tip and the resulting laser diameter where the laser beam intersects the tip can be about 600 μm. In some embodiments, the corresponding fluence can be 850 J/m², depending on the wavelength.

Finally, at box 709, the sample of molecules can be ablated from spots on the sample surface onto a collection device that is suspended above the tip of the atomic force microscope 106 (FIG. 1). The collection device can comprise, for example, a capture wire, such a silver capture wire, or another metal wire. The collection device can be mounted on a three-axis mechanical stage. The collection device can be suspended about 300 μm above the sample surface and about 100 μm from the tip.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method for transferring molecules from a film to a collection device for analysis via an atomic force microscope and a pulsed laser comprising:
    positioning a gold-coated silicon tip of the atomic force microscope above the film to image a sample of the molecules, the gold-coated silicon tip having a radius of curvature and being positioned at a first distance from the film;
    focusing the pulsed laser onto the gold-coated silicon tip of the atomic force microscope;
    ablating the sample from a plurality of ablation spots on the film onto the collection device, the collection device being suspended at a first position relative to the gold-coated silicon tip, wherein a first amount of material from the sample is ablated from each of the ablation spots and transferred onto the collection device.

2. The method of claim 1, wherein the collection device comprises a metal wire.

3. The method of claim 1, wherein the molecules comprise at least one of: anthracene or rhodamine 6G, and wherein a metal wire is cut and affixed to a metal target using double-sided conductive tape, and wherein the molecules are analyzed by laser desorption ionization (LDI) using a commercial laser desorption time-of-flight mass spectrometer.

4. The method of claim 1, wherein the molecules comprise at least one of: angiotensin II or bovine insulin, and wherein the molecules are dissolved in a saturated matrix solution and deposited on a target for matrix-assisted laser desorption ionization (MALDI) analysis.

5. The method of claim 1, wherein the radius of curvature of the gold-coated silicon tip is about 30 nm and the first distance is about 10 nm.

6. The method of claim 1, wherein the first position relative to the gold-coated silicon tip is located about 300 μm vertically from the gold-coated silicon tip and about 100 μm horizontally from the gold-coated silicon tip.

7. The method of claim 1, wherein a polarization of a laser beam of the pulsed laser is adjusted via a half wave plate, the polarization of the laser beam being perpendicular at 355 nm or parallel at 532 nm.

8. The method of claim 7, wherein the laser beam is focused with a 25 cm calcium fluoride ($CaF_2$) lens to irradiate the gold-coated silicon tip at an angle that is 83° from normal.

9. The method of claim 1, further comprising engaging the gold-coated silicon tip in a tapping mode with the sample at an amplitude set point of 1 V.

10. The method of claim 1, wherein the sample is ablated via about 30 laser shots at more than about 3 seconds per ablation spot.

11. The method of claim 1, wherein the analysis is mass spectrometry.

12. The method of claim 11, wherein the resonant frequency is about 300 kHz.

13. A system for capturing and transferring molecules from a surface for mass spectrometry comprising:
    a pulsed laser configured to:
        focus onto a gold-coated silicon tip of an atomic force microscope; and
        ablate the molecules from a plurality of ablation spots on the surface; and
    a collection device configured to:
        capture the molecules ablated from the plurality of ablation spots, the collection device being suspended at a first position relative to the gold-coated silicon tip of the atomic force microscope.

14. The system of claim 13, wherein the pulsed laser is a 355 nm or a 532 nm pulsed laser.

15. The system of claim 13, wherein the pulsed laser is focused onto the gold-coated silicon tip at an angle of about 45° in a horizontal plane relative to the surface and at an angle of about 8° in a vertical plane relative to the surface.

16. The system of claim 13, wherein the collection device comprises a capture wire.

17. The system of claim 16, wherein the capture wire is a silver capture wire and a tip of the silver capture wire is flattened to produce a ribbon of about 400-500 μm in width.

18. The system of claim 13, wherein the first position relative to the gold-coated silicon tip is located about 300 μm above the gold-coated silicon tip and about 100 μm horizontally from the gold-plated silicon tip.

19. The system of claim 13, wherein a focal point of a laser beam of the pulsed laser is about 4 cm beyond the gold-coated silicon tip and a resulting diameter where the laser beam intersects the gold-coated silicon tip is about 600 μm.

20. The system of claim 19, wherein a distance between the collection device and at least one of the plurality of ablation spots is about 100 μm.

* * * * *